US009570918B2

(12) United States Patent
Walley et al.

(10) Patent No.: US 9,570,918 B2
(45) Date of Patent: Feb. 14, 2017

(54) POWER TRANSMITTING SYSTEM CAPABLE OF POWER FLASHING AND SELECTIVE POWER DISTRIBUTION

(71) Applicant: Broadcom Corporation, Irvine, CA (US)

(72) Inventors: John Walley, Ladera Ranch, CA (US); James Bennett, Hroznetin (CZ); Yasantha Rajakarunanayake, San Ramon, CA (US)

(73) Assignee: Broadcom Corporation, Irvine, CA (US)

( * ) Notice: Subject to any disclaimer, the term of this patent is extended or adjusted under 35 U.S.C. 154(b) by 887 days.

(21) Appl. No.: 13/907,587

(22) Filed: May 31, 2013

(65) Prior Publication Data
US 2014/0346885 A1    Nov. 27, 2014

Related U.S. Application Data

(60) Provisional application No. 61/825,682, filed on May 21, 2013.

(51) Int. Cl.
H02J 5/00       (2016.01)
H02J 7/00       (2006.01)
H02J 7/02       (2016.01)
H02J 17/00      (2006.01)

(52) U.S. Cl.
CPC ............. *H02J 5/005* (2013.01); *H02J 7/0027* (2013.01); *H02J 7/025* (2013.01); *H02J 17/00* (2013.01); *H02J 2007/0096* (2013.01)

(58) Field of Classification Search
CPC ............. H02J 5/00; H02J 50/00; H02J 7/025
USPC ........................................... 307/104
See application file for complete search history.

(56) References Cited

U.S. PATENT DOCUMENTS

| 9,059,599 B2* | 6/2015 | Won ................. H02J 7/025 |
| 2014/0001874 A1* | 1/2014 | Nahidipour ............. H02J 17/00 307/104 |
| 2014/0001875 A1* | 1/2014 | Nahidipour ............. H02J 17/00 307/104 |

* cited by examiner

Primary Examiner — Jared Fureman
Assistant Examiner — Duc M Pham
(74) Attorney, Agent, or Firm — Sterne, Kessler, Goldstein & Fox PLLC

(57) ABSTRACT

A wireless power transfer system is disclosed that allows for directed power distribution. A power station that transmits the power can also transmit a distribution instruction that authorizes and/or prohibits various systems/components within a receiver device to receive power. A manager and power router within the receiver device route the power as directed by the distribution instruction. When multiple components/systems are authorized to receive the power, the receiver device can monitor power need and route as needed between authorized components/systems. In addition, the receiver device can act as a transmitter to wireless flash power to another device. The flash consists of bursting a large amount of power over a relatively short time. Several constraints, configurations, and considerations are required to perform this function.

32 Claims, 11 Drawing Sheets

POWER TRANSMITTING SYSTEM CAPABLE OF POWER FLASHING AND SELECTIVE POWER DISTRIBUTION

CROSS REFERENCE TO RELATED APPLICATIONS

This application claims the benefit of U.S. Provisional Application No. 61/825,682, filed May 21, 2013, which is incorporated by reference herein.

BACKGROUND

Field of Invention

The disclosure relates to a wireless charging station and a wirelessly-chargeable receiver and specifically to directing power distribution in the receiver and performing power flashing by the receiver.

Related Art

Wireless power transfer stations, such as power pads, have recently become known. These wireless power transfer stations are able to wirelessly transmit power to a capable receiving device using magnetic coupling between a coil of the power transfer station and a coil of the receiving device. In this manner, the receiving device is able to receive power, for charging, operation, etc., without a wired connection to the power station.

Conventional power pads indiscriminately provide wireless power to a capable receiving device. In other words, the power station transmits power without concern for its use at the receiving device. Typical receiving devices then will default to sending the received power to a rechargeable battery. Although this will allow the device to charge, this default power distribution fails to account for other components that may have a greater need for the power, which then must wait for the battery to sufficiently charge before performing their operations. In addition, conventional receiving devices are configured only to receive power from a power transmitter, and therefore are unable to transmit power to another device that may have a need for the power.

BRIEF DESCRIPTION OF THE DRAWINGS/FIGURES

Embodiments are described with reference to the accompanying drawings. In the drawings, like reference numbers indicate identical or functionally similar elements. Additionally, the left most digit(s) of a reference number identifies the drawing in which the reference number first appears.

DETAILED DESCRIPTION OF THE INVENTION

Figure 1:
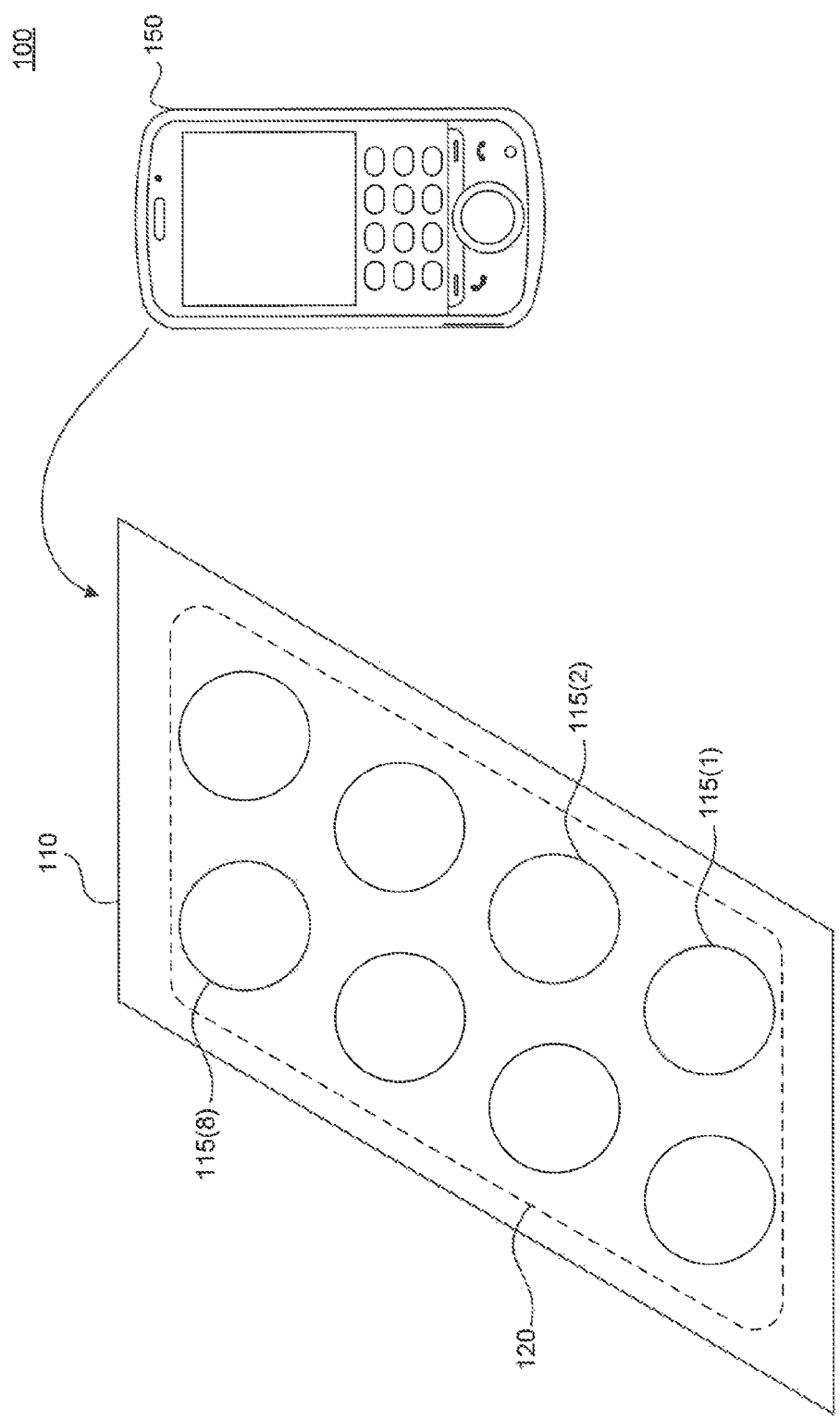
FIG. 1 illustrates an exemplary wireless power transfer environment.

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the invention. Rather, the scope of the invention is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer, as described below.

For purposes of this discussion, the term "module" shall be understood to include at least one of software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings, herein.

Those skilled in the relevant art(s) will recognize that this description may be applicable to many various charging and/or communication methods without departing from the spirit and scope of the present disclosure.

An Exemplary Wireless Power Transfer Environment

FIG. 1 illustrates an exemplary wireless power transfer environment 100. The environment 100 includes a wireless power transfer station (hereinafter "power station") 110. The power station 110 includes at least one coil 115 (115(1)-115 (8) in the example of FIG. 1) arranged in a grid or matrix pattern. The coils send and receive signals between a wirelessly-chargeable device 150. The exchanged signals can include data, commands and/or other communications, and can be used to transfer power from the power station 110 to the device 150. In an embodiment, the coils 115 of the power station 110 may be used as secondary coils to a primary coil 120, discussed in detail below.

When a user of the device 150 seeks to wirelessly charge a battery or other power storage device within the device 150, the user moves the device 150 to be within proximity of the power station 110. After an initialization and setup period, the power station 110 loads, power transfer signals onto one or more of its coils 115 and transmits those signals to the device 150. The device receives the signals from the coils 115 of the power station 110 and extracts power therefrom. In this manner, the power station 110 functions as a power transmitter and the device 150 functions as a power receiver. In embodiments the wireless power transfer is implemented as a magnetic coil-to-coil power transfer using a transmit coil and a receive coil. The transmit coil is excited with an AC current to produce an alternating magnetic field, that induces a secondary AC current in the receive coil when the magnetic field is incident on the receiving coil. The secondary current can then be rectified using a diode bridge so as to produce a DC voltage that can be stored in a battery or used to power receiver circuits. Principles of wireless power transfer and reception are further described in U.S. patent application Ser. No. 13/631,185, titled "Power Transmitting Device Having Device Discovery and Power Transfer Capabilities," filed Sep. 28, 2012, and incorporated by reference in its entirety herein.

Exemplary Wireless Power Transfer Devices and Distribution

Figure 2:
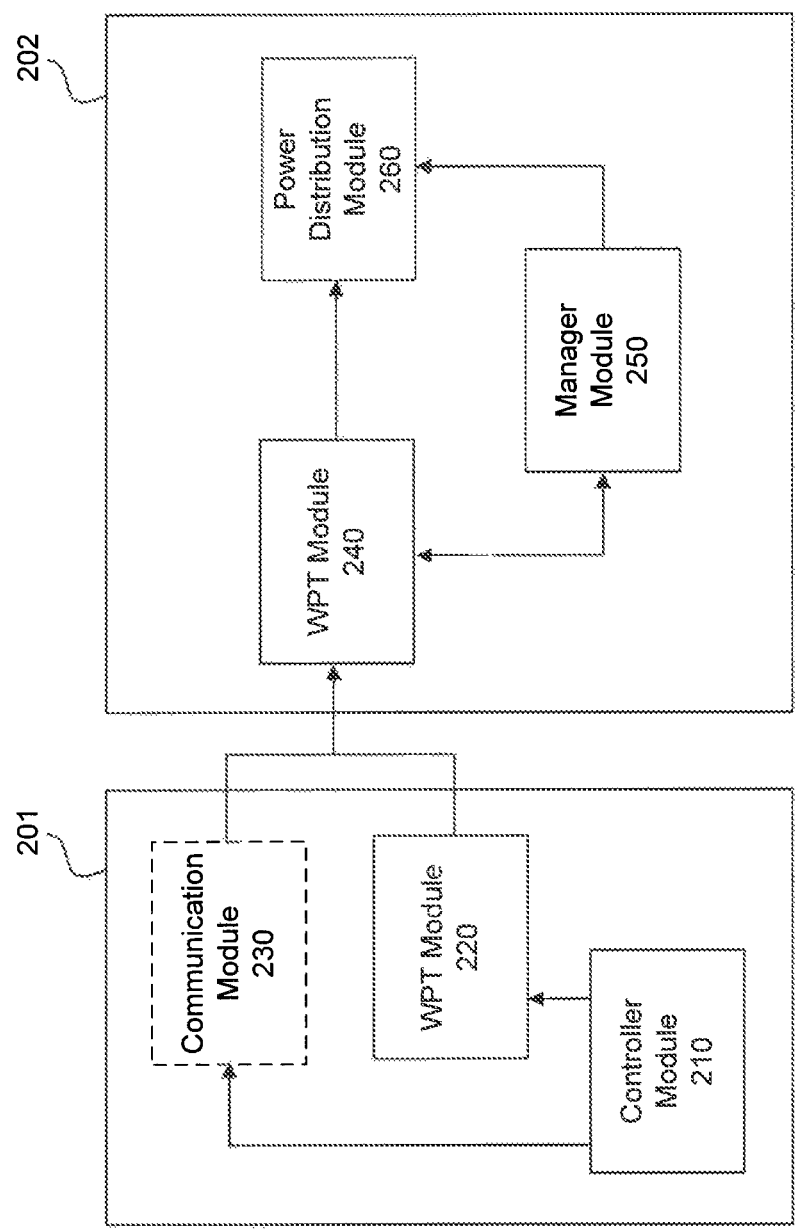
FIG. 2 illustrates a block diagram of an exemplary wireless power station and wireless power receiving device.

FIG. 2 illustrates a block diagram of an exemplary wireless power station 201 and wireless power receiving device 202. The power station 201 includes a controller module 210, a Wireless Power Transfer (WPT) module 220 and a communication module 230, and may, represent an exemplary embodiment of the power station 110. The wireless power receiving device 202 includes a WPT module 240, a manager module 250 and a power distribution module 260 and may represent an exemplary embodiment of the receiving device 150.

During initialization between the power transfer station 201 and the receiving device 202, the power transfer station 201 may need to supply power to the receiving device 202. However, this power may be provided in advance of receiving payment information in order to allow the receiving device 202 to transfer its payment information.

Therefore, while transferring the initialization power, the power station 201 also transmits a distribution instruction. The power station 201 relay transmit this distribution instruction via the WPT module 220 using the WPT standard or via the communication module 230 using any other available wireless communication standard, such as Bluetooth, WLAN, cloud communication, etc.

If sent via WPT, the WPT module 240 of the receiving device receives the distribution instruction and provides the instruction to the manager module 250. If sent via an alternative wireless communication module, the manager module can receive the instruction from a communication module in the receiver module (not shown). The manager module 250 analyzes the received distribution instruction to determine which components are authorized to receive the power. For example, the distribution instruction may dictate, for purposes of initialization, that only certain ones of selectable circuits, such as for example communication and financial components, are authorized to receive power.

Based on the received distribution instruction, the manager module 250 controls a power distribution module 260 to relay the received power from the WPT module 240 to authorized components within the receiver 202.

Figure 3:
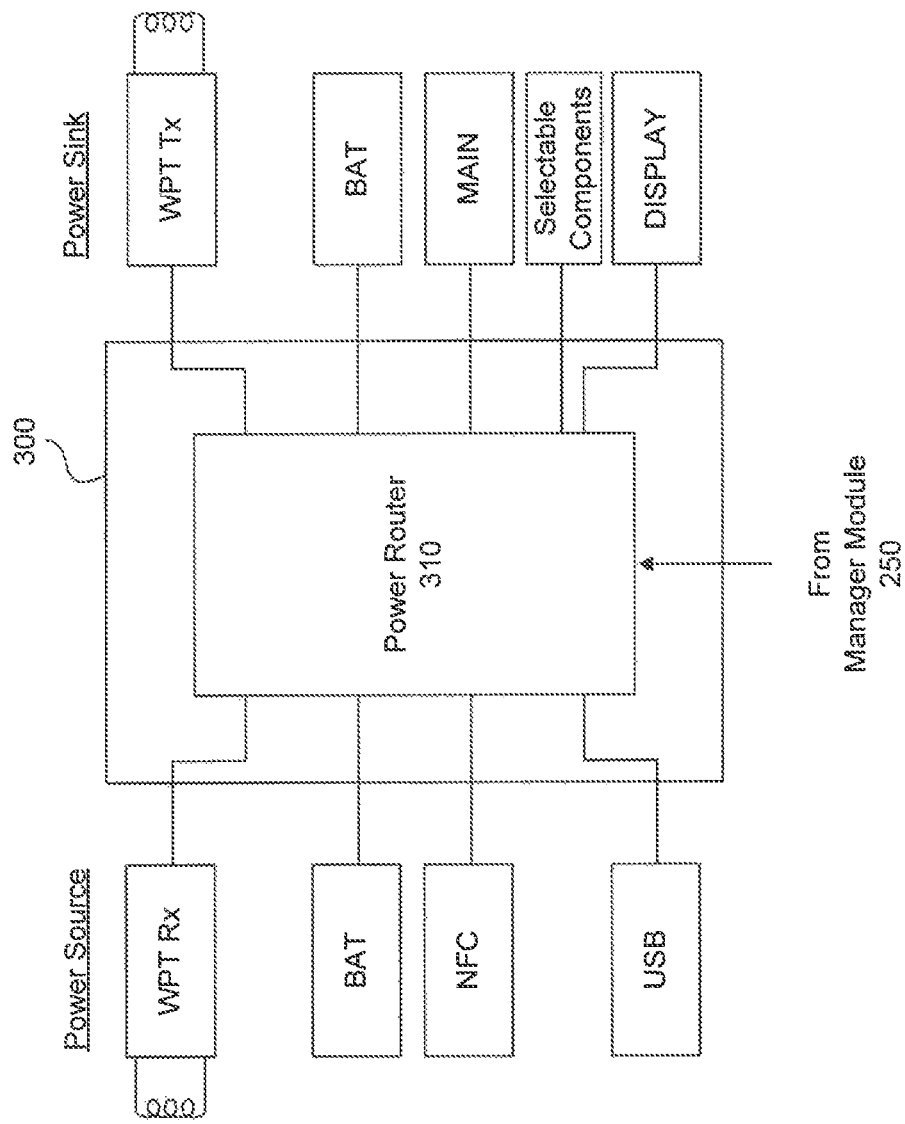
FIG. 3 illustrates a block diagram of an exemplary power distribution module that may be included within the wireless power receiving device.

FIG. 3 illustrates a block diagram of an exemplary power distribution module 300 that may be included within the wireless power receiving device 202. The power distribution module 300 includes a plurality of power sources, a plurality of power sinks, and a power router 310, and may represent an exemplary embodiment of the power distribution module 260.

Each of the power sources represents a component or system in the receiver device that may store, generate, or otherwise provide power to the system. Possible power sources include, but are not limited to, the WPT receiver (e.g., from the WPT module 240), a battery, Near-Field Communications (NFC) receiver, and USB connection. Each of the power sinks represents a component or system in the receiver that may consume power. Possible power sinks include, but are not limited to, WPT transmission (e.g., via the WPT module 240), a battery (when in charging mode), a MAIN processor, and a display and other selectable components.

Each of the power sources can be connected to any one or multiple ones of the power sinks through the power router 310. In this manner, power received from any source can be distributed to any sink within the receiver.

Based on the distribution instruction received from the power station 201, the manager module 250 controls the power router 310 to route power from the relevant power source to the authorized power sinks. For example, during the initialization period, the distribution instruction may allow that power be routed only to the WPT transmitter, the main processor, and the display for returning payment information. Power distribution to the battery may be prohibited in order to prevent unauthorized charging. After the initialization period during which payment information can be exchanged, a new distribution instruction may authorize additional, different, or all power sinks. In this manner, the power station 201 can authorize specific components within the receiver device 202 permitted to receive power in order to prevent unauthorized use/charging.

In addition to the power station 201 controlling power distribution, the receiver device 202 can also control power distribution in order to distribute power as needed to its various components. In other words, the receiver device 202 can prioritize one authorized power sink over another as needed.

For example, in the charging mode, a distribution instruction may authorize the receiver device 202 to move power to any of its power sinks. During this mode, a user of the device may need to access an application processed by the main processor, such as a calendar, internet, or other application. In this case, the manager module 250 can instruct the power router 310 to route power from the WPT receiver power source to the main processor and display power sinks. This may occur when the battery charge is too low to properly function. Once the user completes the actions, the manager module 250 can instruct the power router 310 to route power from the WPT receiver power source to the battery power sink only. In this manner, the receiver device 202 is able to efficiently use received power. These power routing decisions can be made based on power requirements of specific components and/or actions of the receiver device 202 and/or based on an amount of power actually received from the power station and/or other power source.

Figure 4:
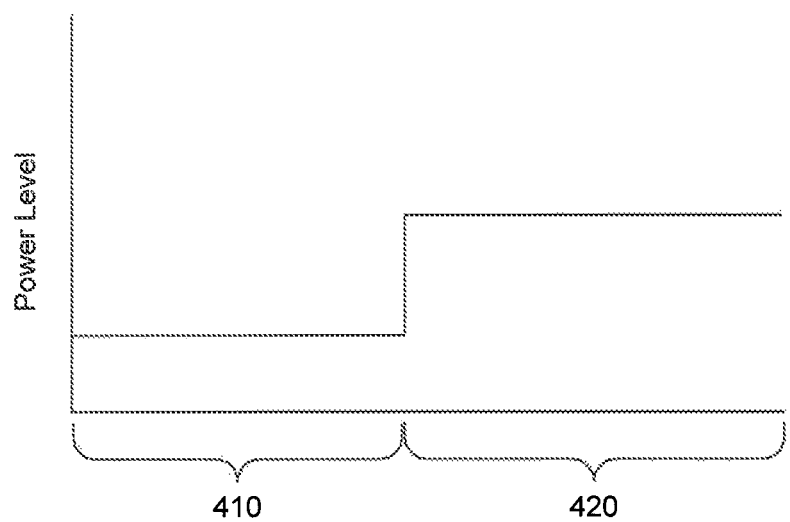
FIG. 4 illustrates a line graph of an exemplary power level provided by the wireless power station.

As another precaution to prevent power theft/misuse, the power station 201 can adjust an amount of power that it transmits to the receiver device 202. For example, FIG. 4 illustrates a line graph 400 of an exemplary power level provided by the wireless power station 201.

During an initialization period 410, the power station can provide a low amount of power. This initialization power can be chosen to be sufficient for retrieving and transmitting financial payment and other initialization information, but insufficient for additionally charging a battery (with efficiency) and/or full device operation. This prevents the receiver device 202 from misusing power received from the power station 201.

In addition, the initialization power can be transmitted for only a predetermined period of time. This period of time should be chosen to be sufficient for the receiver device 202 to respond with the necessary initialization information. Once this initialization period 410 ends, if the necessary information (e.g. payment information such as a valid credit card number) has not been received, or is erroneous, then the power station can stop transmitting power. Alternatively, if the response is successful, the power station 201 can enter a charging, mode 420, in which the power station 201 transmits a larger amount of power sufficient to allow the receiver device 202 to operate and/or charge.

In some instances, the receiver device 202 can simultaneously receive and transmit power, such as in the case of relaying power from the power station 201 to a final power recipient. In this case, the receiver device 202 may receive power from the power station 201 on a first coil coupled to the WPT Rx, and, transmit the power to the final power recipient on a second separate coil coupled to the WPT Tx, as shown in FIG. 3. In an embodiment, the first coil and the second coil operate at different frequencies.

Exemplary Receiver Device Capable of Transferring Power to Another Device

As discussed above, conventional receiver devices are capable only of receiving wireless power. However, by allowing a receiving device to also transmit power to another device, the versatility of the wireless power transfer system can be greatly enhanced.

For example, a receiver can device can be configured to, flash a large amount of power over a small amount of time to a secondary device that requires that power. An example of this may be a digital thermometer. Rather than being equipped with its own battery, the digital thermometer can instead include a capacitor for storing charge and a small coil. The receiver device can use its own coil to flash power to the thermometer, which can then store that power in its capacitor for use. For example, if the thermometer requires 1 mA of power to operate, then flashing the thermometer with 5 A of power over 1 second will allow the thermometer to operate for 5000 seconds (~1.4 hours). This allows the thermometer to operate when needed without an internal battery.

In another example, the receiver device can be used to flash power to a motorized door lock for causing the door lock to disengage. Several other applications may be available in which a device can operate based on a flash of power from the receiver device.

Flashable Device

Figure 5:
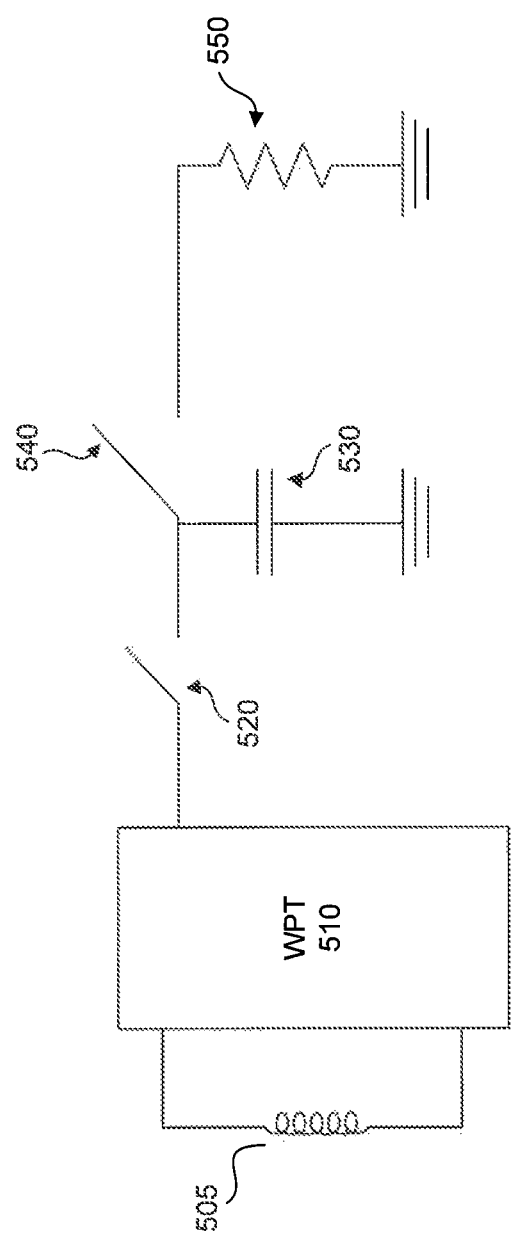
FIG. 5 illustrates a circuit diagram of an exemplary power circuit within a flashable power receiving device.

FIG. 5 illustrates a circuit diagram of an exemplary power circuit 500 within a flashable power receiving device. The flashable device includes a WPT coil 505 connected to a WPT module 510 for receiving WPT power signals from an external device such as mobile device 150. The WPT coil 505 generates an AC current an incident magnetic field. The WPT module 510 can include a diode bridge that rectifies the AC current from the WPT coil to produce a DC voltage. An output of the WPT module 510 is connected to a capacitor 530 via a switch 520 for voltage storage. The capacitor may represent any temporary power storage unit, such as a battery, supercap, etc. The capacitor 530 is connected to a load 550 via switch 540.

In operation, the circuit 500 receives a power flash from the environment via its coil 505 and WPT module 510. During reception, this power is routed to the capacitor 530 by maintaining the switch 520 in a closed state and maintaining the switch 540 in an open state. Once the power flash has concluded, the capacitor 530 stores the charge until needed by the load 550. At that time, the switch 520 is placed in an open position and the switch 540 is placed in a closed position so as to allow for the power stored in the capacitor 530 to flow to the load 550.

Flashing Device

In order for the receiver device to flash power to a flashable device, there are several considerations that should be addressed. For example, most batteries have current restrictions that, when exceeded, can cause significant damage to the battery and/or device as well as pose a safety concern. Because the power flash seeks to transmit a large amount of power over a short period of time, the amount of current passing through the battery should be carefully limited.

In addition, safety standards must also be adhered to. For example, mobile devices generally have strict emissions standards (such as radiation and heat, for example), which must be met. Such standards may include SAR (specific absorption rating) safety levels. The large amount of power to be transmitted can potentially cause overheating in the flashing device, particularly during transmission. Therefore, the flashing device should include foreign object detection hardware and/or software for detecting foreign objects in the vicinity of the flashing device that may absorb the transmitted energy, specifically including human tissue.

In an embodiment, the flashing device transmits power signals at a relatively low frequency in order to reduce energy absorption by foreign objects. Frequency shift and/or reactive tuning may be required to adjust transmission frequencies. In an embodiment, the flashing device can include one or more sensors for detecting foreign objects, such as temperature sensors, infrared detectors, etc.

In addition, k-variation must also be addressed. k represents a coupling coefficient between a primary coil of a transmitting device and a secondary coil of a receiving device. The coupling coefficient k is a representation of a size differential between the primary and secondary coils. For example, a power station may have a very large coil in comparison to that of a receiving device, whereas the coils of the receiving device and a flashable device may be very similar. Therefore, the receiving (flashing) device must compensate for this change when transitioning from receiving power to flashing power.

In an embodiment, in order to compensate for the k-variation, the receiver device operates at a different frequency when receiving power from a power station as compared to transmitting power to a flashable device. For example, the receiver device may receive power at 6 MHz and transmit power at 5.9 MHz. This frequency shift has the effect of retuning the inductors and capacitors within the receiver device's resonant circuits, and allows for k-variation to be addressed. In another embodiment, the receiver device actually retunes its reactive components.

Figure 6:
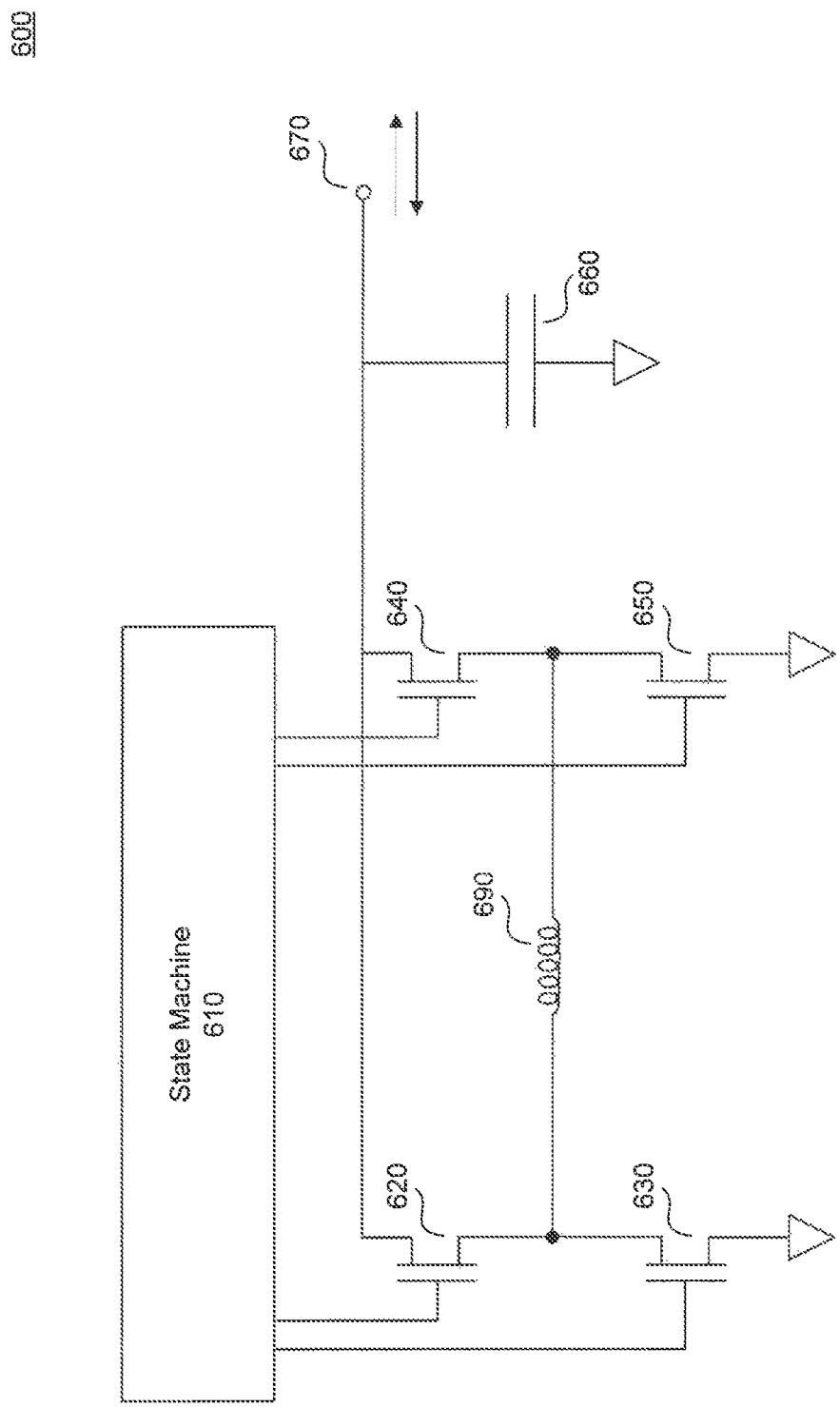
FIG. 6 illustrates a circuit diagram of an exemplary transceiver circuit within a power transceiving device.

In addition, in order for the flashing device to both receive power and transmit power wirelessly, its circuitry must be designed in order to allow for switching between transmission and reception, FIG. 6 illustrates a circuit diagram of an exemplary transceiver circuit 600 within a flashing device, transceiver circuit 600 includes a state machine connected to gates of a plurality of FETs 620-650. The FETs are configured in an H-bridge configuration around a coil 690. A capacitor 660 and an I/O port 670 are connected to the H-bridge. The coil 690 transmits and/or receives wireless power signals to/from another WPT device. The signals received by, or transmitted from, the coil 690 can be passed between the transceiver circuit 600 and WPT transceiver circuitry of its device via the I/O port 670.

Conventional receiver devices employ a synchronous diode configuration. However, such a configuration does not efficiently allow for both reception and transmission of power signals. Therefore, in an embodiment, a receiver device may include the transceiver circuit 600, which is configured as an H-bridge. The state machine 610 controls the FETs 620-650 so as to provide the desired response. For example, during reception, the state machine 610 drives the gates of the FETs so that FETs 630 and 640 are conducting and FETs 620 and 650 are open. On the other hand, during transmission, the state machine 610 drives the FETs so that FETs 620 and 650 are conducting and FETs 630 and 640 are open. The FETs can be driven using, pulse signals.

Exemplary Method for Wirelessly Receiving Power

Figure 7:
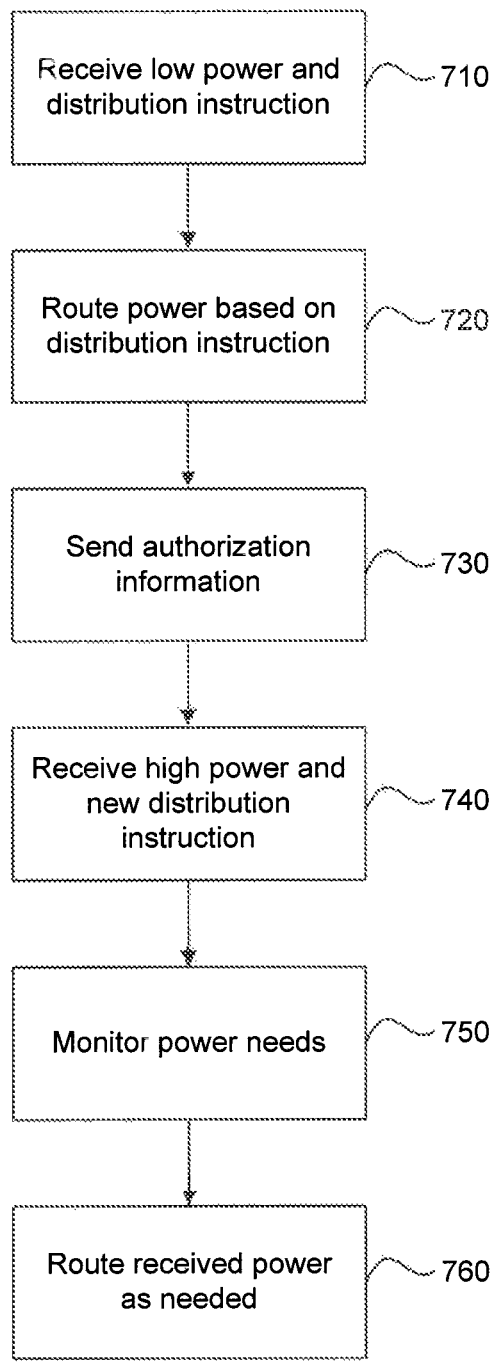
FIG. 7 illustrates an exemplary method for wirelessly receiving power within a receiving device.

FIG. 7 illustrates an exemplary method for wirelessly receiving power within a receiving device.

During an initiation phase, the receiver device wirelessly receives initiation power as well as a distribution instruction (710). The initiation power may be relatively low and insufficient for effectively charging a battery of the receiver device. Based on the distribution instruction, the receiver device routes the received power to authorized components/systems (720).

Generally, during this initiation phase, the receiver device will respond to a power station that is providing the wireless power with authentication information (730). This authentication information may include access information, such as login ID and password, and/or payment information, such as bank account and routing numbers, credit card number and expiration date, etc.

Presuming that the authentication information was sufficient to authenticate the receiver device, the receiver device will then receive charging phase power as well as an updated distribution instruction (740). The updated distribution instruction may authorize multiple components/systems within the receiver device to receive power. Therefore, the receiver device monitors the power needs of its various components/systems (750) and routes power as needed to those components/systems (760).

Those skilled in the relevant art(s) will recognize that the above method can additionally or alternatively include any of the functionality of the power station 110 discussed above, as well as any of its modifications. Further, the above description of the exemplary method should neither be construed to limit the method nor the description of the mobile device power station 110.

Exemplary Receiver Device Capable of Functionality-Based Power Distribution

Described above is a wireless power receiving device 202 that is capable of receiving power routing, instructions from a wireless power station 201, and of routing power received from the wireless power station 201 based on the power routing instructions. However, in another embodiment, the wireless power station may not be concerned with how power is routed within the wireless power receiving device, but rather only that certain functions are performed by the wireless power receiving device. In yet another embodiment, certain power routing instructions may bring up a certain number of base functionality elements which are then capable to receive and process certain functionality instructions, which can then bring up other functional elements when they are needed to carry out corresponding functionality. In other words, there is a coexistence or codependence between the power routing instructions and the desired functionality.

Figure 8A:
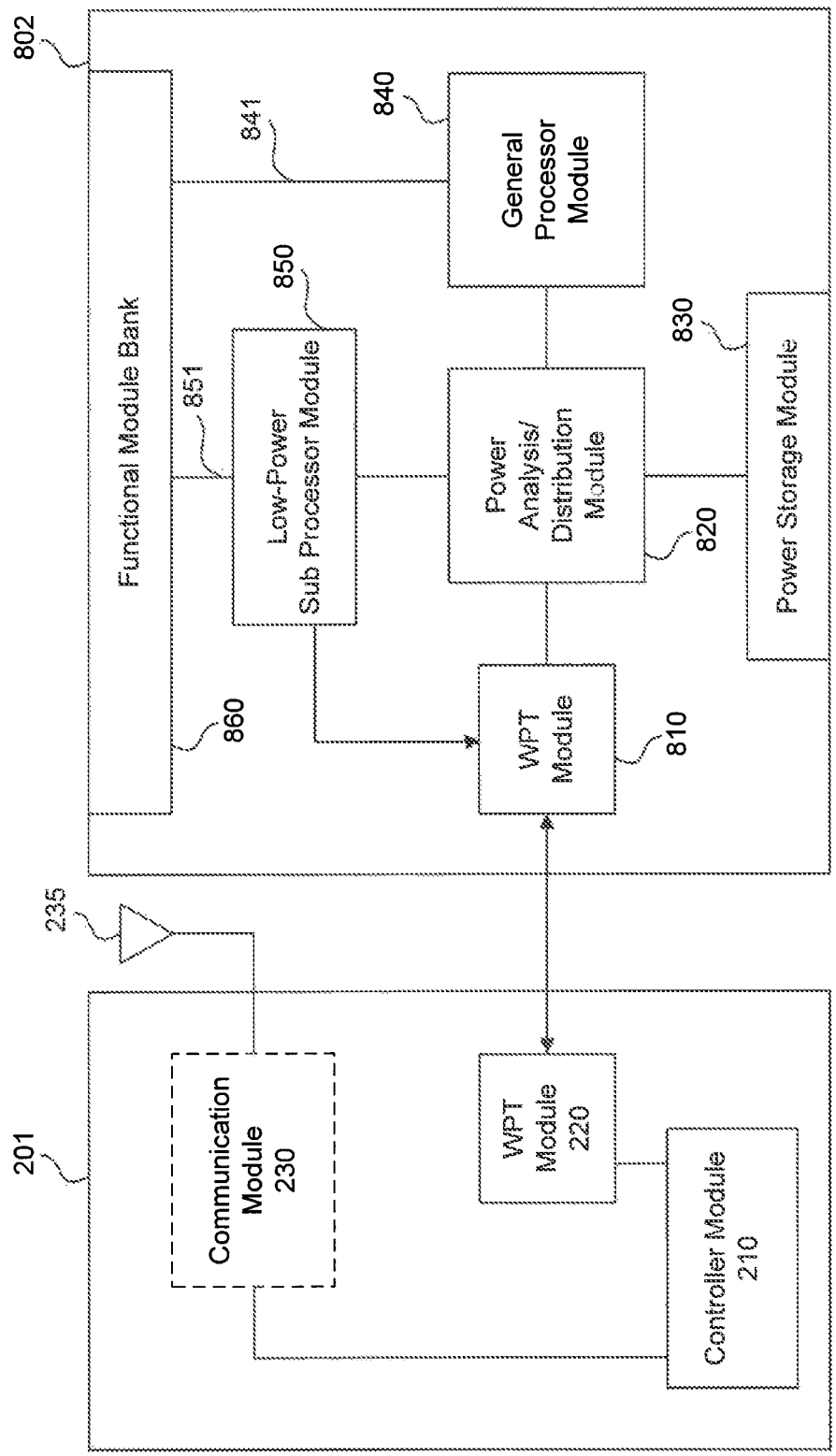
FIG. 8A illustrates a block diagram of an exemplary wireless power station and wireless power receiving device.

FIG. 8A illustrates a block diagram of an exemplary wireless power station 201 and wireless power receiving device 802. The wireless power station 201 is configured substantially as previously discussed, in which a controller module 210 provides signals to one or both of WPT module 220 and communications module 230. WPT module 220 wirelessly transmits information signals and/or communication signals to the wireless power receiving device 802 using the WPT standard, in addition to wireless power transfer. Whereas, communication module 230 wirelessly transmits communication signals to the wireless power receiving device 802 via antenna 235 using its relevant communications standard.

In this embodiment, rather than the controller module 210 generating a distribution instruction for dictating where in the wireless power receiver 802 transmitted power may be routed, the controller module 210 may instead generate a functional instruction that identifies one or more functions requested to be performed by the wireless power receiver 802. For example, the wireless power station 201 can request that the wireless power receiver 802 perform the functions included in the functional instruction as a condition of receiving power. However, the details in how the functions are performed are determined by the wireless power receiving device 802, as it has knowledge of its battery/power state and can therefore best apportion its remaining processing power. Such functions may include responding to an inquiry, displaying of an advertisement, providing billing information, etc., and any combination thereof. Failure to perform the function may result in stopping or limiting power supplied to the wireless power receiver, among other consequences. This functionality will be discussed in further detail below.

The wireless power receiver 802 includes a WPT module 810 for receiving wireless power signals and/or communication signals from the WPT module 220 of the wireless power station 201. The WPT module 810 receives the power and/or communication signals from the WPT module 220 and forwards the signals to a power analysis/distribution module 820. The power analysis/distribution module 820 detects whether the wireless power receiver is operating in a high-power mode (such as a normal operation mode), or a low-power mode (such as a low-battery mode). This determination may be made based on an amount of power detected to be stored in a power storage module 830 (which may include a battery, a super capacitor, or other power storage medium), an activity level of a general processor module 840, or an internal flag, among other indicators.

If the power analysis/detection module 820 determines that the wireless power receiver 802 is operating in a high-power mode, the power analysis/distribution module 820 may route the received power to the power storage module 830 and route any received functional requests to the general processor module 840. In an embodiment, the general processor module 840 is a central processor for controlling general operation of the wireless power receiver 802. When the general processor module 840 receives the functional request, the general processor module 840 determines the actions required to satisfy the functions included within the functional request, and carries out those actions using various functional modules included within a functional module bank 860 in a same manner as during normal operation. The general processor module 840 provides control and/or power signals via general processor line 841, which may include one or more communication lines.

If, on the other hand, the power analysis/detection module 820 determines that the wireless power receiver 802 is operating at a low-power state, it routes the received power and communication signals to a low-power sub-processor module 850. The sub-processor module 850 has a configuration for deciphering and carrying out functions included in the functional instruction received from the wireless power station 201 in a low-power manner as compared to the general processor module 840. Based on the function to be performed, the sub-processor module 850 turns on necessary functional modules included in the functional module bank 860 and causes those functional modules to operate so as to carry out the functions. Once a powered-up functional module has completed its task, the sub-processor module 850 can power down that functional module so as to further conserve power. The sub-processor module 850 may also utilize the WPT module 810 when necessary to carry out a particular function. Any excess power not needed to perform the function can be routed back to the power storage module 830. The sub-processor 850 provides control and/or power signals via sub-processor line 851, which may include one or more communication lines.

Figure 8B:
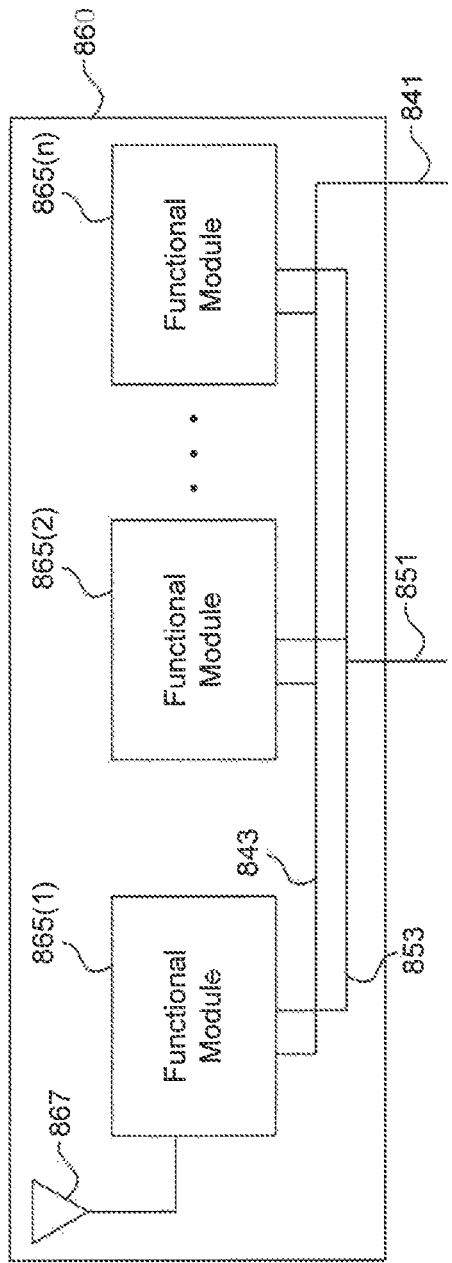
FIG. 8B illustrates an exemplary functional module bank that may be included in the wireless power receiving device.

FIG. 8B illustrates an exemplary functional module bank 860 that may be included in the wireless power receiving device 802. The functional module bank 860 includes a plurality of functional modules 865(1)-865(n) configured to perform various functions. Examples of the functional modules 865 may include memory, memory read drive, display, display drive, one or more sensors (e.g., temperature sensor), control circuitry, user input detection, motion detection, location circuitry, audio processing, audio output, video presentation, video CODEC, and/or payment processing, among others, each with its own or integrated processing circuitry. In addition, at least one of the functional modules (e.g., 865(1)) may be capable of some form of wireless communication via one or more antennas 867. Further, the functional modules 865 may include functional duplicates of one or more of the above that operate at different power levels.

A number of the functional modules 865 may be connected to the general processor 840 via a general processor bus 843 and may also be connected to the sub-processor module 850 via a sub-processor bus 853. The general processor bus 843 receives signals from the general processor 840 via the general processor line 841 and routes the received signals to the various functional modules 865 designated by the general processor 840. Similarly, the sub-processor bus 853 receives signals from the sub-processor module 850 and routes the received signals to the various functional modules 865 designated by the sub-processor module 850.

The functional modules 865 may have various configurations for handling the low-power and high-power operations. For example, FIG. 8C illustrates an exemplary functional module 865 that may be included within the functional module bank 860 according to an embodiment. The functional module 865 includes a functional block 869 for carrying out the actions of the functional module 865. The functional block 869 may be connected to both the general processor bus 843 and the sub-processor bus 853. Because the functional block 869 only receives power/signals from one of the busses at any given time, its operation (low-power or high-power) can be controlled by the general processor 840 or sub-processor module 850 that is supplying the functional module 865 with its instructions.

Figure 8D:
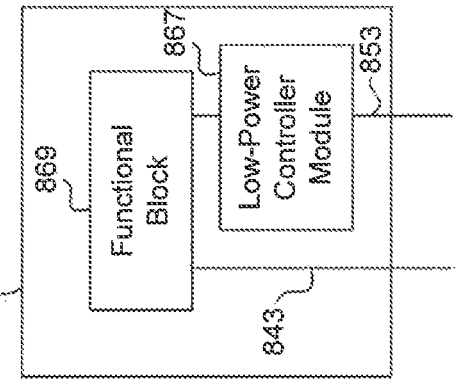
FIGS. 8C and 8D illustrate exemplary functional modules that may be included within the functional module bank.
Figure 8C:
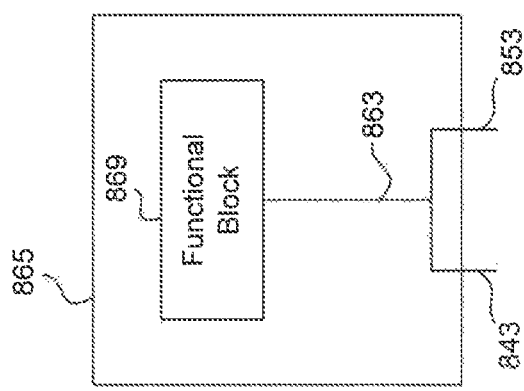

As another example, FIG. 8D illustrates another exemplary functional module 865 that may be included within the functional module bank 860 according to an embodiment. In this embodiment, the functional block 869 may have a general configuration for normal operation, and can therefore receive and process power/instructions directly from the general processor module 840. However, the functional block 865 may also include a low-power controller module 867 for receiving instructions/power from the sub-processor module 850 and for controlling the functional block 869 as needed to carry out those instructions using the power provided, or some alternative low power that is less than the available power.

Example Operation

The following is an exemplary operation of the wireless power receiver 802. It is not intended to limit the operation of the wireless power receiver 802, as many other functions may be executed by the wireless power receiver 802 in substantially the manner described below.

Following power transfer initiation, the controller module 210 of the wireless power station 201 generates a functional instruction for requesting the wireless power receiver 802 to prompt a user as to whether advertisements will be permitted for display to incur a beneficial higher power transfer speed or some other user advantage. For example, upon user agreement, advertisements (e.g. product or service) can be displayed on a user's smart phone in exchange for faster charging. The controller module 210 forwards the functional instruction to the WPT module 220, which wireless transmits the functional instruction along with wireless power signals to the WPT module 810 of the wireless power receiver 802.

The WPT module 810 forwards the received power/instruction signals to the power analysis/distribution module 820. The power analysis/distribution module 820 determines if the wireless power receiver 802 is operating in a low-power state, as its battery may have insufficient power for full device operation. If so, the power analysis/distribution module 820 forwards the received signals to the sub-processor module 850. (The following discussion assumes a low power state initially, since a charge is needed/requested by the device 802. However, the disclosure is not limited to the low power state as will be apparent below.)

The sub-processor module 850 consumes some of the received power for its operation and analyzes the received functional instruction. The functional instruction requires a visual prompt to a user, an input detection from the user, and a response signal to be transmitted back to the wireless power station 201. Therefore, the sub-processor module 850 supplies power to functional modules 865 included in the functional module bank 860, which are designated for performing the above tasks (e.g., a display and display driver, and an input system (such as a keypad or touch-screen) and input detection driver). The sub-processor module 850 then controls the powered-up functional modules 865 to carry out the identified tasks.

For example, the sub-processor module 850 controls the display driver to display a prompt to the user inquiring as to whether advertisements can be displayed for a faster power transfer speed. At the same time, the sub-processor module 850 controls the input detection driver to detect inputs of the user on the input system. Once the user inputs his response, the sub-processor module 850 powers up a functional module 865 having a communication function and causes the response the be returned to the wireless power station 201 via the communication functional module 865. At this time, the sub-processor module 850 may also power down the input detection driver and input system.

Assuming the response indicated that advertisements would be acceptable, the wireless power station 201 begins to transmit power signals at the higher rate, as well as data communications for advertisements to be displayed on the recipient wireless power receiver 802. The sub-processor module 850 maintains the display and display drivers in power-up states and supplies the advertising images to those functional modules 865 for displaying to the user. The sub-processor module 850 may also power up additional functional modules 865 when needed for particular advertisements, such as speakers, speaker drivers, CODECs, vibration control, memory, memory control, etc. Functional modules 865 that have been powered up can be powered down when no longer needed. During these processes, any power beyond that which is used for carrying out the requested functions can be routed to the power storage module for storage and/or device usage.

At some point, the power analysis/distribution module 820 may determine that the amount of power in the power storage module 830 is sufficient to allow for efficient charging and functional operation at a high-power state of the wireless power receiver 802. At this time, the power analysis/distribution module 820 may cause the general processor module 840 to initiate device start-up. Further charging and functional operation may then proceed in the high-power device state.

As discussed above, this example should not be viewed as limiting the disclosure or the operation of the wireless power receiver 802, and is merely intended to provide a generic exemplary operation that may occur within the spirit and scope of the described charging configuration of the wireless power receiver 802. Further, although the above example pertains to receiving a response to an inquiry and displaying advertisements on the recipient device, innumerable other functions may be requested by the wireless power station 201 and carried out by the wireless power receiver 802.

Figure 9:
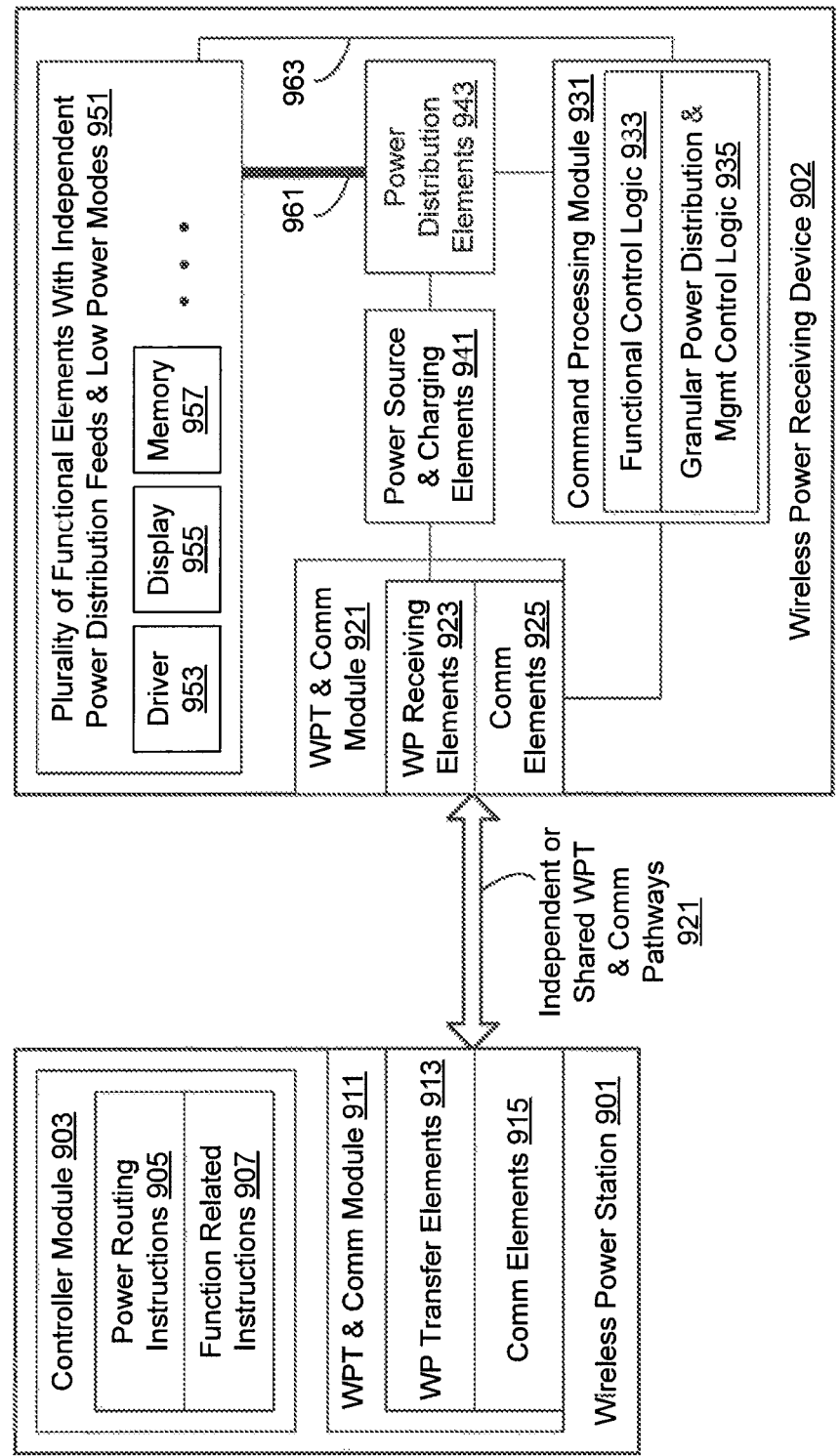
FIG. 9 illustrates a block diagram of an exemplary wireless power station and wireless power receiving device.

FIG. 9 illustrates a block diagram of an exemplary wireless power station 903 and wireless power receiving device 902. In addition to providing wireless power using wireless power transfer elements 913 (e.g. coil driver and coils), a controller module 903 in power station 901 may generate specific power routing instructions 905 and function related instructions 907 for the wireless power receiving device 902 that co-exist with wireless power transfer, or are a condition for wireless power transfer to power receiver device 902. These instructions can be sent by modulating the wireless power during transfer by the wireless power transfer elements 913 (i.e. in-band communications), or using separate wireless communications elements 915 that are out-of-band (e.g. Bluetooth, NFC, infrared, etc.) to transmit the instructions.

At the receiving device 902, the instructions are received by either the wireless power transfer receiving elements 923 when in-band, or the communications elements 925 when out-of-band. Wireless power may also be harvested with any in-band instructions and is stored in power source and charging elements 941 that may include one or more charge storage devices including a battery and/or a capacitor. Power distribution elements 943 can distribute the power to functional elements 951 of the receiving device 902 as necessary to carry out the instructions dictated by the power station 901.

Still referring to FIG. 9, instructions may fall within two categories. First are commands that specifically control any one or more of the plurality of functional elements (e.g. DSP, memory, display driver, display, keypad scanning circuitry, etc.). Second are commands that call for a certain functionality to be carried out. For example, if during wireless power charging, a the wireless power station 901 desires to communicate advertising information on a display within wireless power receiving device 902, either or both of the two categories of commands can be used. In particular, one or more commands from the wireless power station 901 might direct command processing module 931 to (i) power up display driver circuitry 953 and an associated display 955, (ii) power up a display memory 957, (iii) store a delivered advertising image into the memory 957 (e.g., via DMA from 921), and (iv) such that the resultant image gets scanned by the display driver circuitry 953 onto the display 955. This can be done by sending three (3) separate power distribution commands—one to each of the display driver circuitry image 953, display 955, and mage memory 957. In addition, power station 901 could send a further command along with image data payload directing storage of the image data within the image memory 957. Additional commands might be sent to control display duration, refresh rate, display characteristics, or other element scheduling or configuration corresponding to each of the plurality of functional elements being commissioned. These commands can be carried out via a command bus 963. Whereas, power distribution is carried out via power distribution bus 961.

Alternatively, to carry out the same exemplary functionality, a single command along with associated image payload data could be communicated by the power station 901. That is, upon receiving the single command to display the payload with a specified set of configuration details, specific, higher-level logic associated therewith is selected from the logic 933 in the command processing module 931. The selected logic is launched to define power-up, operational set-up, and operations of one or more of the functional elements 951 to carry out an underlying function such as displaying an advertisement in a power configuration, such as a low power configuration. That is, to display the advertising image, the single command might cause one or more of driver 953, display 955, and memory 957 to be powered up, configured, so that payload can be loaded into the memory 957 without requiring detailed step-by-step command management from the power station 901. Likewise, two commands might be used to carry out the same goal, where one command triggers a single action while the other triggers many simultaneously and/or in a predefined sequence of actions.

In addition, although not shown, a security element can be integrated into either or both of WPT and communications module 921 and command processing module 931 to prevent unauthorized devices from gaining control of all or any subset of the plurality of functional elements 951 within the wireless power receiving device 902. For example, any unauthorized attempt to control the device 902 might immediately be rejected by the WPT and communications module 921. An authorized device might gain full access, while a partially authorized device might only gain access to a subset of the functional control logic 933 and/or the granular power distribution logic 935.

In addition, instead of selectively removing or distributing power to each of the plurality of functional elements, the functional elements can be placed into a low power consuming mode or state. For example, a display may be placed in a power off mode, a low power idle or inactive mode, a low power operational mode no backlighting, low frame rate, low resolution, minimal bit color, etc.), and any number of higher power operational modes. Thus, commands from power station 901 need not only control power distribution using on/off modes as described above, but may supplement the single "on" mode with a plurality of on mode possibilities. For example, in the above example, because the advertising image does not need to be at a high resolution and requires no quick frame changes, a first command plus image payload may direct the wireless power receiver device 902 to enter a low power operational mode to service the image. The command may be followed with other counterpart commands to place the driver 953 and memory 957 into the same mode. Alternatively, the first command may comprise a functional command and all of such mode configurations might take place simultaneously in response thereto without the need of further commands using functional control logic 933.

A second example instruction from the power station 901 is for the receiving device 902 to provide payment information either stored in a memory, or via user input (e.g. credit or debit card information). In addition to the functional elements discussed above, a driver for a touch screen or button may be activated so as to enable a user to input the payment information using a touch keypad.

Exemplary Computer System Implementation

It will be apparent to persons skilled in the relevant art(s) that various elements and features of the present disclosure, as described herein, can be implemented in hardware using analog and/or digital circuits, in software, through the execution of instructions by one or more general purpose or special-purpose processors, or as a combination of hardware and software.

Figure 10:
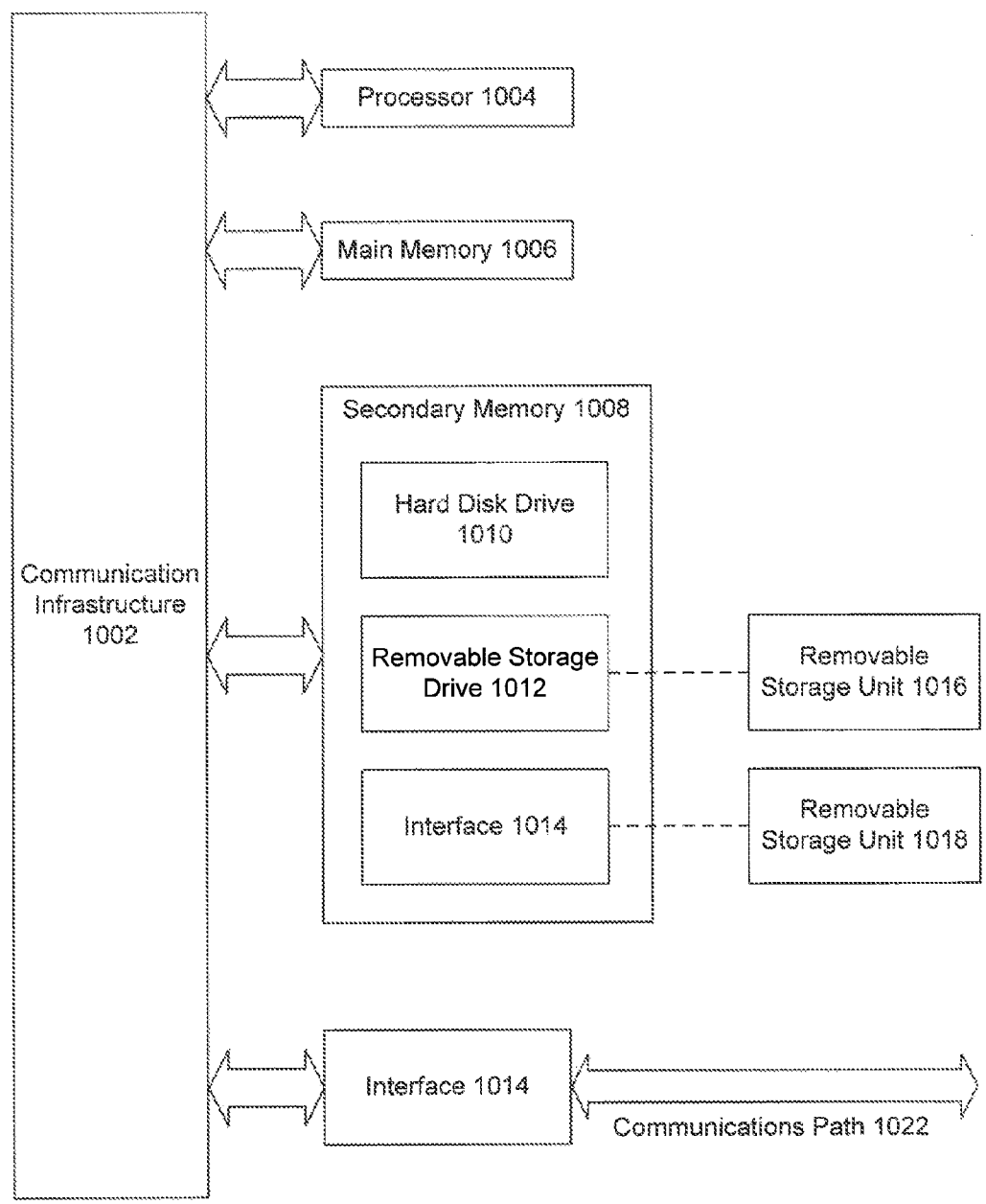
FIG. 10 illustrates a block diagram of an exemplary general purpose computer system.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. An example of such a computer system 1000 is shown in FIG. 10. One or more of the modules depicted in the previous figures can be at least partially implemented on one or more distinct computer systems 1000.

Computer system 1000 includes one or more processors, such as processor 1004. Processor 1004 can be a special purpose or a general purpose digital signal processor. Processor 1004 is connected to a communication infrastructure 1002 (for example, a bus or network). Various software implementations are described in terms of this exemplary computer system. After reading this description, it will become apparent to a person skilled in the relevant art(s) how to implement the disclosure using other computer systems and/cm computer architectures.

Computer system 1000 also includes a main memory 1006, preferably random access memory (RAM), and may also include a secondary memory 1008. Secondary memory 1008 may include, for example, a hard disk drive 1010 and/or a removable storage drive 1012, representing a floppy disk drive, a magnetic tape drive, an optical disk drive, or the like. Removable storage drive 1012 reads from and/or writes to a removable storage unit 1016 in a well-known manner. Removable storage unit 1016 represents a floppy disk, magnetic tape, optical disk, or the like, which is read by and written to by removable storage drive 1012. As will be appreciated by persons skilled in the relevant art(s), removable storage unit 1016 includes a computer usable storage medium having stored therein computer software and/or data.

In alternative implementations, secondary memory 1008 may include other similar means for allowing computer programs or other instructions to be loaded into computer system 1000. Such means may include, for example, a removable storage unit 1018 and an interface 1014. Examples of such means may include a program cartridge and cartridge interface (such as that found in video game devices), a removable memory chip (such as an EPROM, or PROM) and associated socket, a thumb drive and USB port, and other removable storage units 1018 and interfaces 1014 which allow software and data to be transferred from removable storage unit 1018 to computer system 1000.

Computer system 1000 may also include a communications interface 1020. Communications interface 1020 allows software and data to be transferred between computer system 1000 and external devices. Examples of communications interface 1020 may include a modem, a network interface (such as an Ethernet card), a communications port, a PCMCIA slot and card, etc. Software and data transferred via communications interface 1020 are in the form of signals which may be electronic, electromagnetic, optical, or other signals capable of being received by communications interface 1020. These signals are provided to communications interface 1020 via a communications path 1022. Communications path 1022 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 1016 and 1018 or a hard disk installed in hard disk drive

1010. These computer program products are means for providing software to computer system 1000.

Computer programs (also called computer control logic) are stored in main memory 1006 and/or secondary memory 1008. Computer programs may also be received via communications interface 1020. Such computer programs, when executed, enable the computer system 1000 to implement the present disclosure as discussed herein. In particular, the computer programs, when executed, enable processor 1004 to implement the processes of the present disclosure, such as any of the methods described herein. Accordingly, such computer programs represent controllers of the computer system 1000. Where the disclosure is implemented using software, the software may be stored in a computer program product and loaded into computer system 1000 using removable storage drive 1012, interface 1014, or communications interface 1020.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

CONCLUSION

It is to be appreciated that the Detailed Description section, and not the Abstract section, is intended to be used to interpret the claims. The Abstract section may set forth one or more, but not all exemplary embodiments, and thus, is not intended to limit the disclosure and the appended claims in any way.

The invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus, the invention should not be limited by any of the above-described exemplary embodiments, but should be defined only in accordance with the following claims and their equivalents.

What is claimed is:

1. A device capable of wirelessly receiving power from a power station in a wireless power transfer environment, the device comprising:
    a wireless power transfer module configured to receive wireless power transfer signals and a distribution instruction from the power station;
    a power distribution module configured to selectively route power from one or more power sources to one or more power sinks; and
    a manager module configured to control the power distribution module based on the distribution instruction.

2. The device of claim 1, wherein the distribution instruction indicates to which of the one or more power sinks the power distribution module is permitted to route power.

3. The device of claim 2, wherein the distribution instruction authorizes components for responding with payment information during an initiation phase to receive power.

4. The device of claim 2, wherein the wireless power transfer module is configured to transmit payment information to the power station, and to receive an updated distribution instruction in response thereto.

5. The device of claim 4, wherein the updated distribution instruction authorizes additional power sinks within the device for receiving power.

6. The device of claim 5, wherein the manager module is configured to monitor power needs of various components within the device, and is configured to control the power distribution module to route power to those components on an as-needed basis.

7. The device of claim 4, wherein the wireless power transfer module also receives charging mode power signals from the power station that provide larger amounts of power than the wireless power transfer signals in response to transmitting the payment information.

8. A power transmitter capable of wirelessly transmitting power to a receiver device within a wireless power transfer environment, the power transmitter comprising:
    a wireless power transfer module configured to transmit initiation power signals to the wireless power transfer environment; and
    a communication module configured to transmit a first distribution instruction to the receiver device, the first distribution instruction including a list of authorized power sinks within the receiver device for receiving power included in the initiation power signals.

9. The power transmitter of claim 8, further comprising a controller module configured to authorize power transfer to the receiver device based on payment information,
    wherein the wireless power transfer module is configured to receive the payment information from the receiver device in response to the initiation power signals.

10. The power transmitter of claim 9, wherein the controller module is configured to authenticate the payment information, and to permit or prohibit the power transfer to the receiver device based on a result of the authentication.

11. The power transmitter of claim 10, wherein upon authentication of the payment information, the communication module is configured to transmit a second distribution instruction to the receiver device, and the wireless power transfer module is configured to transfer charging power signals to the receiver device.

12. The power transmitter of claim 11, wherein the second distribution instruction authorizes a number of power sinks that is larger than a number of power sinks authorized by the first distribution instruction.

13. The power transmitter of claim 11, wherein the charging power signals include more power than the initiation power signals.

14. The power transmitter of claim 8, wherein the communication module transmits the first distribution instruction over Bluetooth.

15. A method for wirelessly transceiving power by a receiver device, the method comprising:
    receiving an initiation power and a first distribution instruction from a power station;
    routing the initiation power to one or more power sinks within the receiver device based on the first distribution instruction; and
    transmitting authentication information to the power station using at least a portion of the initiation power.

16. The method of claim 15, further comprising:
    receiving, in response to the transmission of the authentication information, a charging power and a second distribution instruction.

17. The method of claim 16, wherein the charging power is larger in magnitude than the initiation power, and
wherein the second distribution instruction includes a number of power sinks to receive power that is larger than the one or more power sinks authorized by the first distribution instruction.

18. The method of claim 16, further comprising:
monitoring power needs of the one or more power sinks included in the receiver device; and
routing power to the one or more power sinks based on the power needs and the second distribution instruction.

19. The method of claim 16, further comprising:
reconfiguring a transceiver circuit for transmission; and
flashing power to a flashable device, the flashing including transmitting a relatively large amount of power over a short amount of time to the flashable device.

20. The method of claim 19, wherein the reconfiguring of the transceiver circuit is performed by controlling gates of one or more transistors included within the transceiver circuit, and
wherein the one or more transistors are in an H-bridge configuration with a coil of the receiver device.

21. A device capable of wirelessly receiving power from a power station in a wireless power transfer environment, the device comprising:
a first functional module being capable of entering into a plurality of first power consuming modes;
a second functional module being capable of entering into a plurality of second power consuming modes, both the plurality of first power consuming modes and the plurality of second power consuming modes including at least one higher power consuming mode and at least one lower power consuming mode;
at least one wireless interface configured to receive both wireless power and a command from the power station;
a command processing module configured to respond to the command by both directing the first functional module to enter one of the plurality of first power consuming modes, and directing the second functional module to enter one of the plurality of second power consuming modes.

22. The device of claim 21, wherein the command comprises a functional command that triggers corresponding program logic being associated with the command processing module.

23. The device of claim 22, wherein the corresponding program logic defines scheduling functionality.

24. The device of claim 23, wherein the scheduling functionality causes the first and second functional modules to enter their corresponding ones of the first and second power consuming modes in a serial manner.

25. The device of claim 23, wherein the scheduling functionality further causes the second functional module to enter the corresponding one of the second power consuming modes after the first functional module has performed a corresponding function associated with the first functional module.

26. The device of claim 23, wherein the corresponding program logic defines configuration processing functionality associated with the first functional module.

27. The device of claim 21, wherein the at least one lower power consuming mode comprises a powered down mode.

28. The device of claim 21, wherein the first and second functional modules include one of a visual display, a display, a driver, a memory, and a user interface.

29. The device of claim 22, wherein the program logic causes a request to be made for payment information, and wherein the first and second functional modules include a memory to store the payment information.

30. The device of claim 21, further comprising:
a power analysis and distribution module configured to determine a power state of the device and enable one of the command processing module or a sub-processor module based on the power state, the sub-processor module being configured to provide selective delivery of the received power to the first and the second functional modules based on the command.

31. The device of claim 30, wherein the power analysis and distribution module enables the sub-processor module for a low power state, and enables the command processing module for a high power state.

32. The device of claim 31, further comprising a power storage device, wherein the power analysis and distribution module determines the power state based on a charge stored in the power storage device, and enables the sub-processing module when the charge is below a threshold.

* * * * *